United States Patent [19]
Okada

[11] Patent Number: 5,211,999
[45] Date of Patent: May 18, 1993

[54] LAMINATED COMPOSITE COMPOSED OF FIBER-REINFORCED CERAMICS AND CERAMICS AND METHOD OF PRODUCING SAME

[75] Inventor: Akira Okada, Yokohama, Japan

[73] Assignee: Nissan Motor Co., Ltd., Yokohama, Japan

[21] Appl. No.: 725,801

[22] Filed: Jul. 9, 1991

[30] Foreign Application Priority Data

Jul. 9, 1990 [JP] Japan .................................. 2-181036

[51] Int. Cl.$^5$ .......................... A47G 19/22; B32B 9/04; D04H 1/58
[52] U.S. Cl. .................... 428/34.5; 428/34.4; 428/34.6; 428/289; 428/367; 428/408; 428/698; 428/902; 428/224; 428/36.91
[58] Field of Search ...................... 428/34.5, 34.6, 224, 428/289, 408, 446, 698, 367, 902

[56] References Cited

U.S. PATENT DOCUMENTS

4,341,826  7/1982  Prewo et al. ........................ 428/34.5
4,511,612  4/1985  Hüther et al. ...................... 428/34.5

FOREIGN PATENT DOCUMENTS

316551  11/1988  European Pat. Off. .

*Primary Examiner*—George F. Lesmes
*Assistant Examiner*—Kathryne E. Shelborne
*Attorney, Agent, or Firm*—Lowe, Price, LeBlanc & Becker

[57] ABSTRACT

A laminated composite includes a layer of monolithic ceramics and a layer of fiber-reinforced ceramics. The layer of fiber-reinforced ceramics is placed on the layer of SiC ceramics. The layer of SiC ceramics is made of a densely sintered body of SiC. The layer of fiber-reinforced ceramics is made of SiC-matrix ceramics reinforced by continuous SiC fiber.

4 Claims, 2 Drawing Sheets

LAMINATED COMPOSITE COMPOSED OF FIBER-REINFORCED CERAMICS AND CERAMICS AND METHOD OF PRODUCING SAME

BACKGROUND OF THE INVENTION

1. Field of the Invention

The present invention relates to a laminated composite and a method of producing the same, which composite is composed of a layer of fiber-reinforced ceramics and a layer of SiC ceramics and is applicable to various mechanical parts which require high heat resistance, particularly high strength and high toughness in high temperature.

2. Description of the Prior Art

A variety of ceramics have been hitherto proposed for a material of various mechanical parts which are to be exposed to high temperature. Those ceramics are considered to be a suitable material for mechanical parts, for example, for parts of a gas turbine. However, the mechanical parts of the gas turbine require high strength and high toughness in high temperature in particular.

Thus, some ceramics which are proposed to be used for the gas turbine, when exposed to combustion gas having a high temperature, tend to be broken because they can not withstand tensile stress. For example, monolithic ceramics, when they have a tiny defective part having a length ranging from tens of micron to hundreds of micron, tend to be easily broken by tensile stress due to their low fracture toughness. When monolithic ceramics are so made as to increase their fracture toughness, that is, to increase their plastic deformation capability at an end of a crack formed therein, other mechanical characteristics of them will be deteriorated due to inevitable increase of creep speed. Therefore, monolithic ceramics are limited in improving their fracture toughness. Furthermore, when monolithic ceramics are constructed to have more than a certain size, the strength of the same will be lowered drastically.

In view of the above, ceramic composites have been proposed to compensate for unsatisfactory fracture toughness of monolithic ceramics. For example, ceramic composites which are reinforced by acicular particles such as whisker or platelike particles and the like have somewhat improved fracture toughness as compared with that of monolithic ceramics. However, production of those ceramic composites is too complicated for carrying out an economical production thereof. Continuous-fiber reinforced ceramic composites have high fracture toughnes thereby making them hard to break catastrophically. However, those composites are relatively weak against shearing stress.

SUMMARY OF THE INVENTION

It is therefore an object of the present invention to provide a material which has both high strength and high toughness in high temperature.

It is a further object of the present invention to provide a material of which strength and toughness in high temperature will not deteriorate so much even when the material is constructed to have more than a certain size.

According to a first aspect of the present invention, there is provided a laminated composite comprising: a first layer of a SiC ceramic; and a second layer of a fiber-reinforced ceramic which is placed on the first layer.

According to a second aspect of the present invention, there is provided a method for producing a laminated composite, comprising the following steps in the sequence: placing SiC fibers on a SiC ceramic; placing graphite on the SiC fibers; heating the SiC fibers and the graphite up to temperatures of about 1000° C. and about 500° C., respectively; and exposing the SiC fibers to an atmosphere of trichloromethylsilane gas diluted by $H_2$ gas so as to get SiC fibers impregnated with SiC.

According to a third aspect of the present invention, there is provided a method for producing a laminated composite, comprising the following steps in the sequence: placing SiC fibers on a SiC ceramic; impregnating the SiC fibers with polycarbosilane; and heating the SiC fibers so as to decompose the polycarbosilane into SiC.

DETAILED DESCRIPTION OF THE INVENTION

According to the present invention, there is provided a laminated composite which is composed of a layer of fiber-reinforced ceramics and a layer of SiC ceramics.

In one embodiment of the present invention, a silicon carbide (SiC)-fiber reinforced SiC composite or carbon-fiber reinforced SiC composite is used for a material of the layer of fiber-reinforced ceramics. A densely sintered body of SiC is used for a material of the layer of SiC ceramics.

According to the present invention, the laminated composite has a structure of two layers. However, if desired, a laminated composite having a structure of three layers or more may be employed.

A method for producing the laminated composite will be described in the following.

Powder of $\beta$-SiC in amounts of 98.5 wt % is mixed with 0.5 wt % of boron powder and 1 wt % of carbon powder. The thus mixed powder is sintered in the atmosphere of argon gas or in a vacuum, at a temperature ranging from 2000° C. to 2100° C. to obtain a densely sintered body of SiC.

A sheet of continuous fiber of SiC is placed on the resultant densely sintered body of SiC. Then, the continuous fiber of SiC on the sintered body of SiC is impregnated with SiC to obtain a SiC-matrix composite which is reinforced by the continuous fiber of SiC. The sheet of continuous fiber of SiC is fixedly secured to the densely sintered body of SiC through the impregnation. This process can be carried out by either a so-called gas phase method or a so-called liquid phase method.

In the gas phase method, graphite is placed on a sheet of continuous fiber of SiC which has been placed on the densely sintered body of SiC. The graphite and the continuous fiber of SiC are heated up to temperatures of about 500° C. and about 1000° C., respectively, and exposed to trichloromethylsilane (CH₃SiCl₃) gas diluted by hydrogen (H₂) gas in order to impregnate the continuous fiber of SiC with SiC. Due to provision of graphite on the continuous fiber, which has the above-mentioned temperature relative to the temperature of the continuous fiber of SiC, it is made possible to uniformly impregnate the continuous fiber of SiC with SiC.

In the liquid phase method, the continuous fiber of SiC placed on the sintered body of SiC is impregnated with polycarbosilane. Then, polycarbosilane is converted into SiC by heat decomposition thereof.

Figure 1:
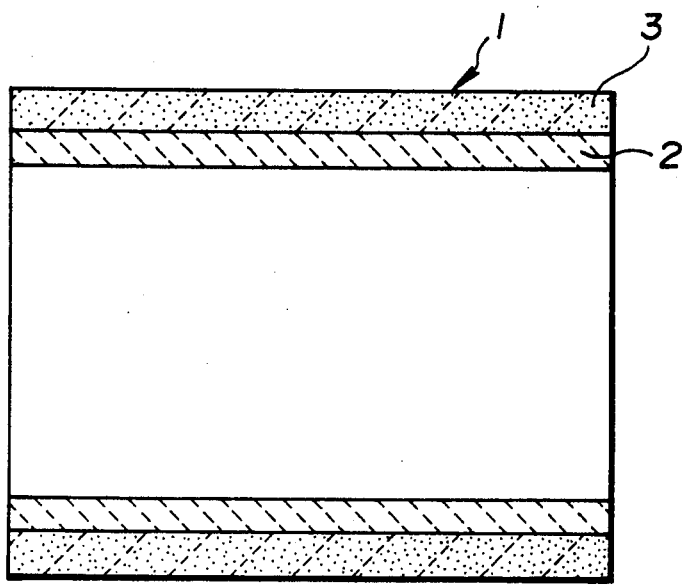
FIG. 1 is an axially sectional view of a laminated composite of the present invention, which is formed into a tubular shape.
Figure 2:
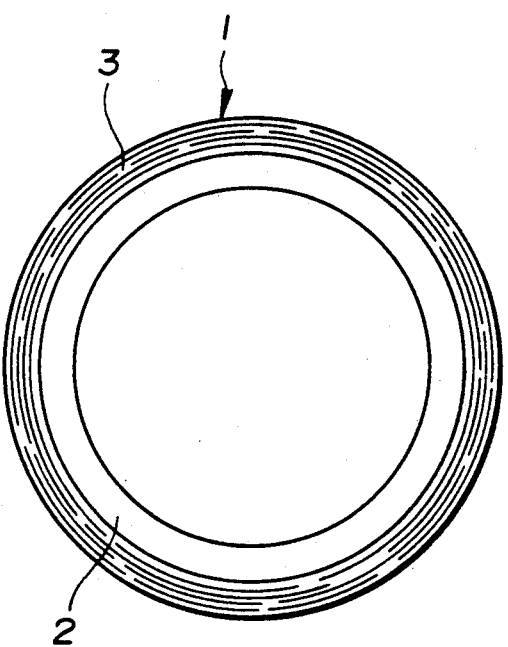
FIG. 2 is a laterally sectional view of the laminated composite which is shown in FIG. 1.

The resultant laminated composite can be formed into various shapes for their use. In one example, as shown in FIGS. 1 and 2, a laminated composite 1 which is tubular in shape may be provided. To make this tubular laminated composite 1, a densely sintered body of SiC which has been formed into tubular in shape is covered at its outer surface with a sheet of continuous fiber of SiC. Then, in accordance with the above-mentioned method, SiC matrix is formed in the fiber to produce the tubular laminated composite 1. The thus obtained tubular laminated composite 1 has an inner layer of SiC ceramics 2 which is strong enough against shearing stress and compressive stress and an outer layer of continuous-fiber reinforced ceramics 3 which is strong enough against tensile stress.

A combustion gas passage or a heat chamber of a gas turbine, when exposed to combustion gas of high temperature, is subjected at its inner portion to substantial compressive stress and at its outer portion to substantial tensile stress. Therefore, the tubular laminated composite 1 which has the above-mentioned mechanical characteristics can be a suitable material for the combustion gas passage or the heat chamber of the gas turbine. When the tubular laminated composite 1 is used for the gas turbine, the inner layer of SiC ceramics 2 is directly exposed to combustion gas of a high temperature. As is known, a high temperature accelerates oxidation or deterioration of the inner layer of SiC ceramics 2 which are non-oxide ceramics. However, due to provision of the inner layer which is the densely sintered body of SiC, a passive film of dense quartz glass is formed on the inner surface of the inner layer and thus oxidation of the inner layer is supressed.

Figure 3:
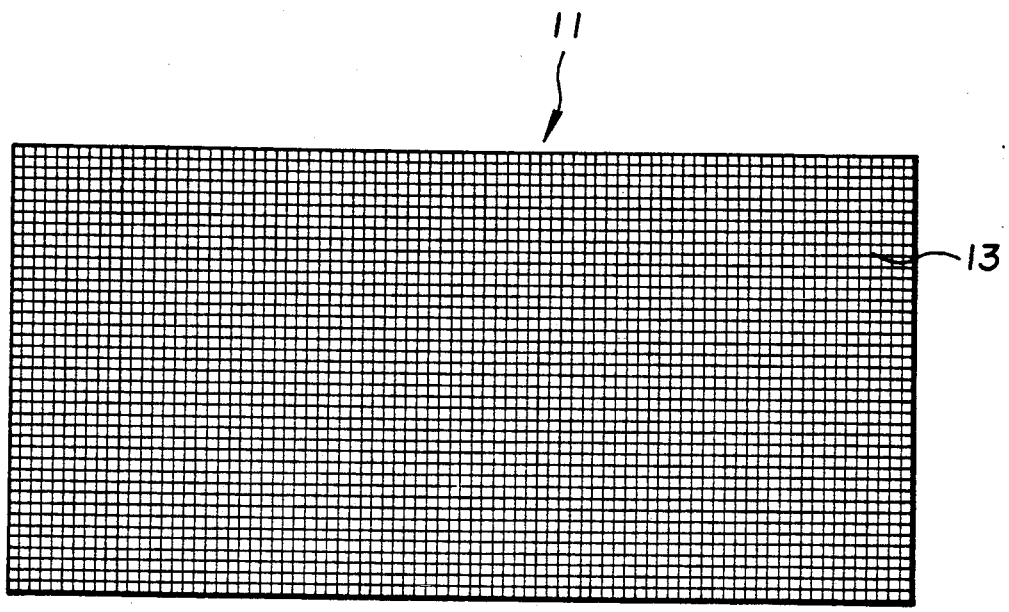
FIG. 3 is a plan view of a laminated composite of the present invention, which is formed into flat rectangular shape.
Figure 4:
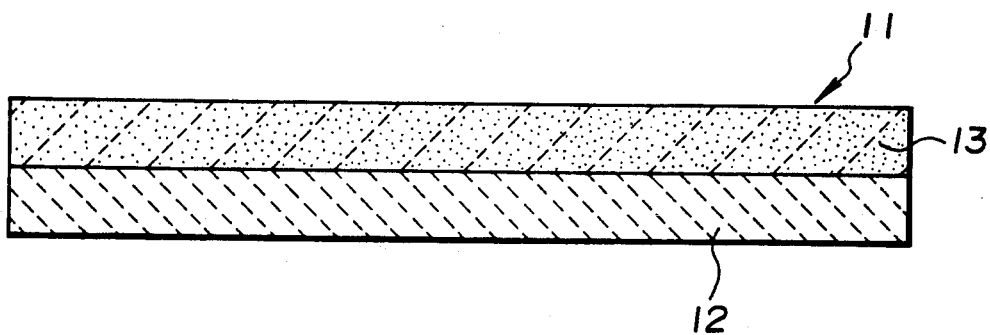
FIG. 4 is a side view of the laminated composite which is shown in FIG. 3.

In another example, as shown in FIGS. 3 and 4, a laminated composite 11 which is flat rectangular in shape may be provided. The laminated composite 11 is a suitable material for a heat-resistant plate which is subjected to bending stress in high temperature. In this example, as shown in FIG. 3, continuous fibers of SiC are orthogonally arranged. A sintered body of SiC which has been formed into flat rectangular shape is employed to produce the laminated composite 11. Description of the method to produce the laminated composite 11 will be omitted because it is substantially the same as that of the afore-mentioned laminated composite 1. Four edges of a major surface of the sintered body of SiC, which major surface is secured to the continuous fiber of SiC, must be chamfered in order to prevent damage to the continuous fiber of SiC. The resultant laminated composite 11 is composed of a layer of SiC ceramics 12 and a layer of continuous-fiber reinforced ceramics 13.

When the laminated composite 11 is supported at its four corner portions and receives bending load at its central portion, tensile stress and compressive stress induced by bending load are sustained by the continuous fiber of SiC and the densely sintered body of SiC, respectively. Thus, the laminated composite 11 is strong enough against bending load and thus hard to break. Even when the laminated composite 11 is constructed to have more than a certain size, its strength is not lowered so much as compared with monolithic ceramics alone or continuous-fiber reinforced ceramics alone.

We claim:

1. A laminated composite comprising:
   a first layer consisting essentially of a densely sintered body of SiC; and
   a second layer of a SiC-matrix ceramic reinforced by a member of the group consisting of continuous SiC fiber and carbon fiber which is secured to said first layer.

2. A laminated composite as claimed in claim 1, in which said fiber-reinforced ceramic is said SiC-matrix ceramic reinforced by continuous SiC fiber.

3. A laminated composite as claimed in claim 1, in which said laminated composite is tubular in shape, and in which said first and second layers constitute inner and outer layers of the tubular laminated composite, respectively.

4. A laminated composite as claimed in claim 1, in which said first and second layers are flat rectangular in shape.

* * * * *